United States Patent
Hidaka et al.

(10) Patent No.: US 7,528,569 B2
(45) Date of Patent: May 5, 2009

(54) INVERTER CIRCUIT FREE FROM POWER-SOURCE-VOLTAGE FLUCTUATION

(75) Inventors: Kenichiro Hidaka, Chita-gun (JP); Hisashi Kameya, Kariya (JP); Mitsutomo Iwase, Obu (JP); Yasuo Ito, Nagoya (JP); Masahiro Miyata, Kariya (JP); Takahiro Kojo, Gotenba (JP)

(73) Assignees: Denso Corporation, Kariya, Aichi-Pref (JP); Toyota Jidosha Kabushiki Kaisha, Toyota, Aichi-Pref (JP)

( * ) Notice: Subject to any disclaimer, the term of this patent is extended or adjusted under 35 U.S.C. 154(b) by 300 days.

(21) Appl. No.: 11/514,346

(22) Filed: Sep. 1, 2006

(65) Prior Publication Data

US 2007/0052384 A1 Mar. 8, 2007

(30) Foreign Application Priority Data

Sep. 2, 2005 (JP) ............................. 2005-255380

(51) Int. Cl.
*H02P 27/04* (2006.01)
(52) U.S. Cl. ..................... 318/801; 318/802; 318/807; 318/803; 318/811
(58) Field of Classification Search .......... 318/801–811
See application file for complete search history.

(56) References Cited

U.S. PATENT DOCUMENTS 5,801,519 A * 9/1998 Midya et al. ................ 323/222
5,811,949 A * 9/1998 Garces ........................ 318/448
7,064,504 B2 * 6/2006 Imai et al. .............. 318/400.04
7,122,991 B2 * 10/2006 Kitajima et al. ............. 318/800
2005/0029972 A1 * 2/2005 Imai et al. .................... 318/254

FOREIGN PATENT DOCUMENTS

JP 2004-201414 7/2004

OTHER PUBLICATIONS

EPO Extended Search Report mailed Oct. 23, 2007 in Application No. 06018123.7.
Office Action dated Sep. 26, 2008 in CN Patent Application No. 2006 1012 9042.0 with English translation.

* cited by examiner

*Primary Examiner*—Rita Leykin
(74) *Attorney, Agent, or Firm*—Nixon & Vanderhye PC

(57) ABSTRACT

An inverter circuit includes a bridge circuit constituted of a plurality of pairs of a high-side switching element and a low-side switching element, a command signal processing section, a pulse generating section for generating pulse signals to control the inverter bridge circuit according to the command signal to have a dead time to prevent short circuiting of the dc power source and a command signal compensation section. The compensation section modifies the command signal according to a current voltage level of the dc power source to control the dead zone, thereby preventing deformation of ac output power of the bridge circuit.

15 Claims, 3 Drawing Sheets

INVERTER CIRCUIT FREE FROM POWER-SOURCE-VOLTAGE FLUCTUATION

CROSS REFERENCE TO RELATED APPLICATION

The present application is based on and claims priority from Japanese Patent Application 2005-255380, filed Sep. 2, 2005, the contents of which are incorporated herein by reference.

BACKGROUND OF THE INVENTION

1. Field of the Invention

The present invention relates to an inverter circuit for converting dc electric power to ac electric power, which is to be supplied to a motor for a steering power assisting system.

2. Description of the Related Art

Generally, an inverter circuit includes an inverter constituted of a plurality of series-connected pairs of a high-side switching element and a low-side switching element and a PWM (pulse width modulation) control circuit. The inverter is controlled by the PWM control circuit to convert dc power into ac power as disclosed in JP-A 2004-201414. If each of the high-side and low-side switching elements is a MOSFET, the drain of the low-side switching element is grounded, the source of the positive side MOSFET is connected to a battery terminal, and the gate of each MOSFET is connected to the PWM control circuit.

In order to prevent short circuiting of the inverter from the battery terminal to the ground, it is necessary to provide a time lag or a dead time in the switching operation between the high-side switching elements and the low-side switching elements. Therefore, the inverter circuit can not provide its output current during the dead time even when the PWM control circuit sends a command voltage signal to the inverter circuit. As a result, the output ac power of the inverter circuit includes a waveform distortion, which may cause torque ripples when the output ac power is supplied to an ac motor. In JP-A 2004-201414, the waveform distortion is compensated or corrected by calculating a voltage deviation based on the command voltage signal, an output ac voltage of the inverter and an input dc voltage. However, the above way of compensation can not work very well if the dc power voltage changes.

The inventors conducted various tests and found that a dead zone of operation of an inverter, which is caused by the dead time, changes as the input dc power source voltage changes.

SUMMARY OF THE INVENTION

Therefore, an object of the invention is to provide an improved inverter circuit that can provide stable output ac power even if the voltage of an input power source fluctuates. For this purpose, the dead zone is controlled according to the voltage of the dc power source.

According to a feature of the invention, an inverter circuit includes an inverter constituted of a plurality of pairs of a high-side switching element and a low-side switching element connected in series with each other to form a pair of input terminals connected with a dc power source, a command signal processing section for providing a command signal to set a prescribed amount of the ac output power of the inverter, a pulse generating section for generating pulse signals for controlling the inverter according to the command signal to have a dead time to prevent short circuiting of the dc power source thereby forming a dead zone of operation, and a command signal compensation section for modifying the command signal according to a current voltage level of the dc power source to control the dead zone.

Because the command signal is modified according to the voltage level of the dc power source, the pulse signal is modified to control the inverter to provide the ac output power having a waveform that does not cause torque ripples of an ac motor to be connected to the inverter.

In the inverter circuit as featured above: the pulse generating section may include a booster circuit for boosting voltage of the dc power source to generate the pulse signal for controlling the inverter; the command signal compensation section may include a memory that stores data of the dead zone; the inverter is connected to an electric motor to drive the same; the inverter includes three pairs of a high-side switching element and a low-side switching element and the electric motor is a three-phase ac motor; the dc power source is a battery mounted in a vehicle.

Another object is to drive an electric motor that is free from torque ripples.

According to another feature of the invention, an inverter circuit includes a three-phase inverter, including a three-phase bridge circuit of switching elements, input terminals connected with a battery and output terminals connected with an electric motor, a command signal processing section for providing a command signal to control the electric motor; a pulse generating section for generating pulse signals for controlling the inverter according to the command signal to have a dead period to prevent the inverter from short circuiting of the battery, whereby the inverter has a dead zone of operation, and a command signal compensation section for modifying the command signal according to a voltage level of the battery to control the dead zone.

In the above inverter circuit: the command signal processing section may provide the command signal according to signals of a steering angle sensor and a vehicle speed sensor; the command signal compensation section may include a memory that stores data of the dead zone relative to the voltage level of the battery.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

A preferred embodiment of the present invention will be described with reference to the appended drawings.

Figure 1:
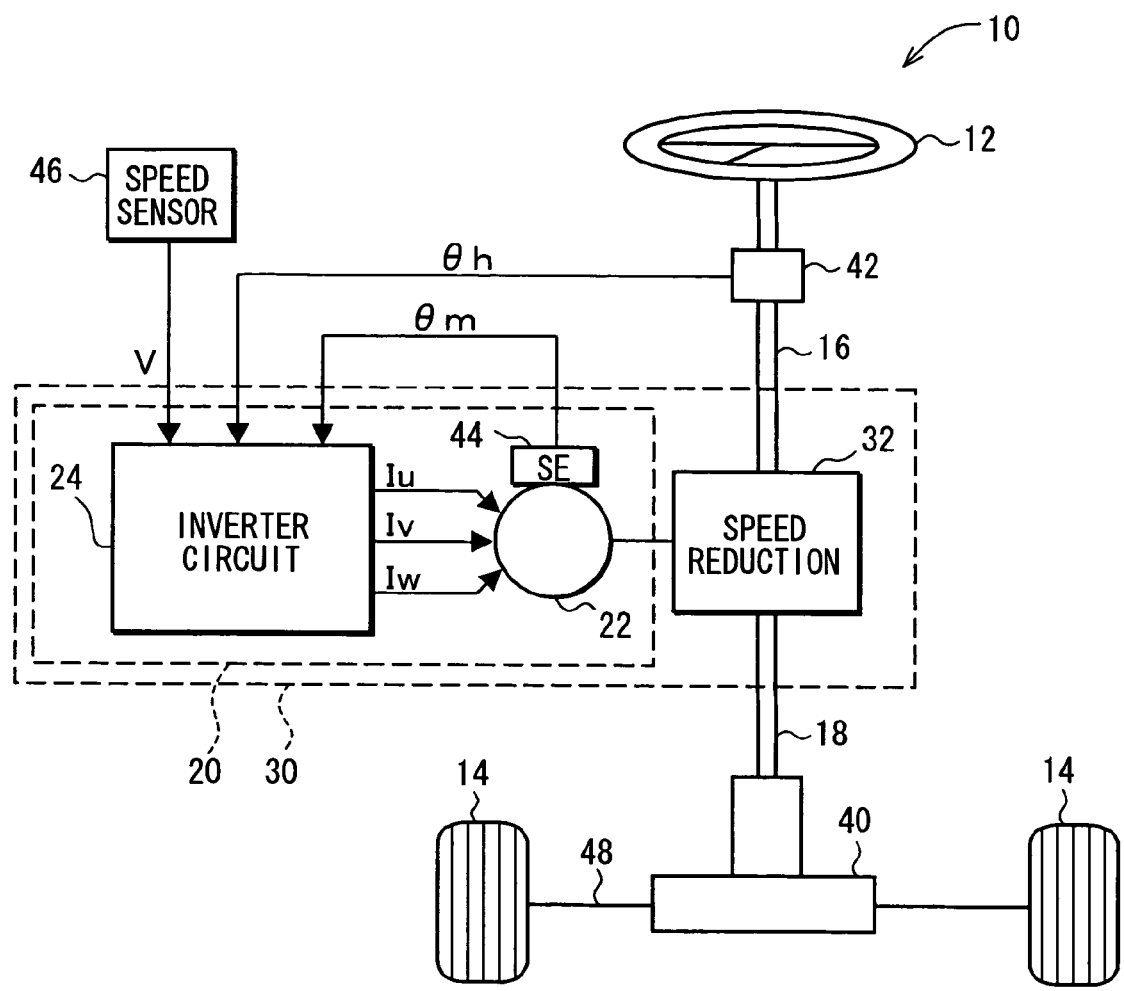
FIG. 1 is a power steering system to which a power assisting motor according to a preferred embodiment of the invention is applied.

As shown in FIG. 1, a power steering system 10 includes a steering wheel 12, vehicle wheels 14 an input shaft 16, an output shaft 18, a transfer ratio control unit 30, a rack-and-pinion steering gear box 40, a steering angle sensor 42, a vehicle speed sensor 46 and a rack shaft 48.

The transfer ratio control unit 30 is constituted of a motor unit 20 and a speed reduction mechanism 32, which is constituted of a planetary gear mechanism.

The power steering system assists a driver to steer vehicle wheels 14 by a steering wheel 12, which is linked with the vehicle wheels 14 via the input shaft 16, the speed reduction mechanism 32, the output shaft 18, the rack-and-pinion steering gear box 40 and the rack shaft 48. The rack shaft 48 is connected with the vehicle wheels 14 via tie-rods (not shown).

The motor unit 20 includes an ac motor 22 that drives the speed reduction mechanism 32, an inverter circuit 24 and a motor-rotation angle sensor 44. The inverter circuit 24 controls rotation angle of the motor 22 so as to change the transfer ratio G of the output shaft 18 to the input shaft 16.

The motor 22 is a permanent magnet type brushless motor that has a three-phase stator having three phase-coils. The motor 22 may have four or more phase-coils or may be a induction type motor.

The steering angle sensor 42 detects the rotation angle $\theta_h$ of the input shaft 16 or the steering wheel 12 and sends its output signal to the inverter circuit 24. The motor-rotation angle sensor 44 detects the rotation angle (electric angle) $\theta_m$ of the motor 22 and sends the output signal thereof to the inverter circuit 24. The vehicle speed sensor 46 detects the speed V of a vehicle and sends its output signal to the inverter circuit 24. The inverter circuit 24 includes a microcomputer that is constituted of a CPU, a ROM, a RAM, etc, and calculates the output rotation angle $\theta_p$ of the output shaft 18 and steered angle of the wheels 14 based on the rotation angle $\theta_m$ of the motor 22 and the transfer ratio G of the output shaft 18.

The inverter circuit 24 calculates the transfer ratio G of the transfer ratio control unit 30 based on the vehicle speed V. The inverter circuit 24 also calculates and the variation of the output rotation angle $\theta_p$ based on the transfer ratio G and the variation of the rotation angle $\theta_h$. A target motor rotation angle $\theta_{mm}$ is calculated based on a difference between an actual value of the motor-rotation angle $\theta_m$ and an actual value of the output rotation angle $\theta_p$ so that the output rotation angle $\theta_p$ can equal to a calculated value. A command voltage Vq* is calculated based on the target motor rotation angle $\theta_{mm}$. Then, an amount of motor current (Iu, Iv, Iw) of a sine wave is supplied to each phase coil of the three-phase stator winding.

When a vehicle stops or runs at a low speed, the power steering system 10 reduces steering work of a driver by controlling the motor 22 to change the transfer ratio G so as to increase the steered angle of the wheels 14 relative to the rotation angle $\theta_h$. On the other hand, the power steering system 10 increases the steering work by controlling the motor 22 to change the transfer ratio G so as to decrease the steered angle of the wheels 14 relative to the rotation angle $\theta_h$ when the vehicle is runs at a high speed.

Figure 2:
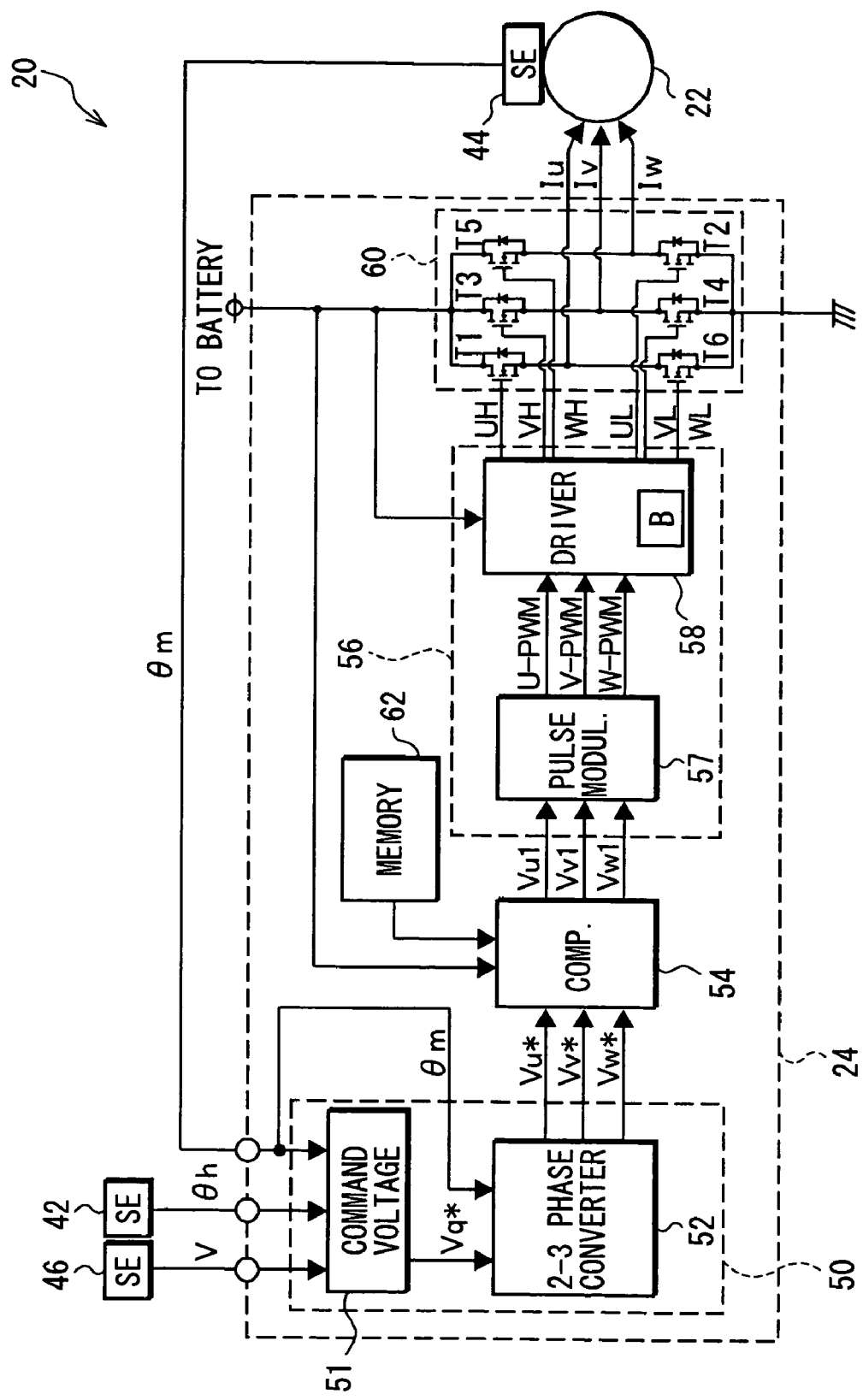
FIG. 2 is a block diagram of an inverter circuit for driving the motor shown in FIG. 1.

As shown in FIG. 2, the inverter circuit 24 includes a command voltage processing section 50, a compensation section 54, a pulse generating section 56, an inverter 60 and a memory 62.

The pulse generating section 56 includes a pulse modulating circuit 57 and a driving circuit 58. Incidentally, the driving circuit 58 includes a booster circuit B. The inverter 60 is a three-phase bridge circuit that is constituted of three high-side switching elements (e.g. MOSFET) T1, T3, T5 and three low-side switching elements (e.g. MOSFET) T2, T4, T6. Each of the switching elements T1-T6 has a gate connected to the driving circuit 58 to receive from it one of driving signals UH, VH, WH, UL, VL, WL. Incidentally, each of the switching elements may be an insulated gate bipolar transistor (IGBT).

Figure 3:
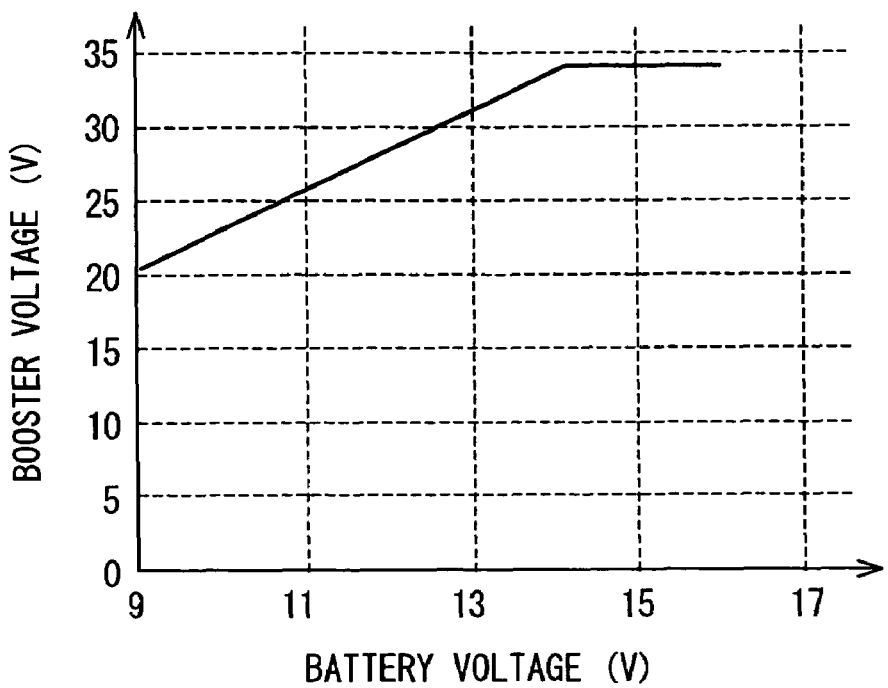
FIG. 3 is a graph showing a relationship between output voltages of a booster circuit and battery voltages.

The driving signals UH, VH, WH applied to the gates of the high-side switching elements are boosted by the booster circuit according to the battery voltage, as shown in FIG. 3. On the other hand, the driving signals UL, VL, WL applied to the gates of the low-side switching elements have the same voltage as the battery. While the driver circuit respectively applies the driving signals to the gates of the switching elements, the switching elements turn on or off to form three-phase motor currents Iu, Iv, Iw, which are supplied to the three phase-coils of the motor 22.

The command voltage processing section 50 includes a command voltage processing circuit 51 and a two-phase-to-three-phase converting circuit 52. The command voltage processing circuit 51 calculates a command voltage Vq* to equalize the rotation angle $\theta_m$ of the motor 22 with the target motor rotation angle $\theta_{mm}$ based on the rotation angle $\theta_h$ of the input shaft 16, the rotation angle $\theta_m$ and the vehicle speed V. The command voltage Vq* is outputted as a q-axis voltage to the two-phase-to-three-phase converting circuit 52.

The two-phase-to-three-phase converting circuit 52 converts the command voltage Vq* to three phase command voltages Vu*, Vv*, Vw* based on the rotation angle $\theta_m$ of the motor 22. The three phase command voltages Vu*, Vv*, Vw* are inputted to the compensation section 54, which compensates the three-phase command voltages Vu*, Vv*, Vw* based on compensation data stored in the memory 62 to provide compensated command voltages Vu1, Vv1, Vw1, which are sent to the pulse modulating circuit 57 of the pulse generating section 56. In the compensation section 54, a compensation value is added to each of the three phase command voltages Vu*, Vv*, Vw*.

Figure 4:
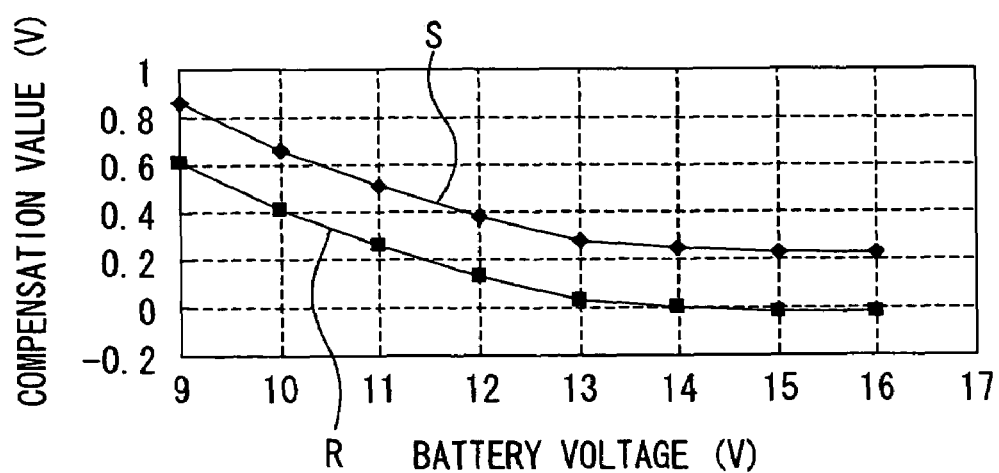
FIG. 4 is a graph showing a dead zone voltage curve and a compensation curve relative to battery voltages.

As shown in FIG. 4, the compensation value is selected from the compensation data (curve R) stored in the memory 62 based on the battery voltage (dc source voltage). The curve R is formed from a dead zone curve S, which is obtained from a test in which the dead time, the booster voltage, battery voltage, etc., are changed. The compensation value equalizes the level of the dead zone at a current battery voltage to the level of the dead zone when the battery voltage is 14 volts, which may be changed to 12 volts, 13 volts or other voltage according to a design policy or other circumstances.

For example: if the battery voltage is 14 volts, the compensation value is 0 (volt) to be added to the command voltages Vu*, Vv*, Vw*; and if the battery voltage is 11 volts, the compensation value is 0. 25 (volts) to be added to the command voltages Vu*, Vv*, Vw* so that the level of 0.5 volts on the dead zone curve S can be reduced by the level of 0.25 volts on the curve R of the compensation data to be the same level as the level of 0.25 volts on the dead zone S at 14 volts. Incidentally, the compensation has to be carried out so that the absolute value of the compensated command voltages Vu1, Vv1, Vw1 can be larger than the command voltages Vu*, Vv*, Vw*. In other words, if the command voltages Vu*, Vv*, Vw* are negative, the compensation value to be added has to be negative.

The pulse modulating circuit 57 converts the compensated phase voltages Vu1, Vv1, Vw1 into duty ratios (%). That is, the compensated phase voltage Vu1 is converted into a U-PWM signal, the compensated phase voltage Vv1 is converted into a V-PWM signal, and the compensated phase voltage Vw1 is converted into a W-PWM signal, which are sent to the driving circuit 58.

The driving circuit 58 provides driving signals UH, VH, WH, UL, VL, Wl to control the switching elements T1-T6.

Thus, the motor current Iu, Iv, Iw can be controlled to be free from the fluctuation of the battery voltage, so that the waveform distortion and the torque ripples can be minimized.

The above compensation can be carried out by utilizing the relationship between the battery voltage and the output voltage of the booster circuit shown in FIG. 3. In this case, the compensation value is set according to the output voltage of the booster circuit.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An inverter circuit comprising:
    an inverter, including a plurality of pairs of a high-side switching element and a low-side switching element that are connected in series with each other to form a pair of input terminals connected with positive and negative terminals of a dc power source, for providing ac output power at a plurality of output terminals;
    a command signal processing section for providing a command signal to set a prescribed amount of the ac output power;
    a pulse generating section for generating pulse signals for controlling said inverter according to the command signal to turn on or off with timing that includes a dead time to prevent short circuiting the dc power source, whereby said inverter has a dead zone of operation; and
    a command signal compensation section for modifying the command signal according to changes in the dc power source voltage level to thereby control a level of the dead zone to a preset level corresponding to that which would be expected for a predetermined constant dc power source voltage level.

2. An inverter circuit comprising:
    an inverter, including a plurality of pairs of a high-side switching element and a low-side switching element that are connected in series with each other to form a pair of input terminals connected with positive and negative terminals of a dc power source, for providing an ac output power at a plurality of output terminals;
    a command signal processing section for providing a command signal to set a prescribed amount of the ac output power;
    a pulse generating section for generating pulse signals for controlling said inverter according to the command signal to turn on or off with timing that includes a dead time to prevent short circuiting the dc power source, whereby said inverter has a dead zone of operation; and
    a command signal compensation section for modifying the command signal, wherein:
    said pulse generating section comprises a booster circuit for boosting voltage of the dc power source to generate the pulse signal for controlling said inverter; and
    said command signal compensation section modifies the command signal according to changes in an output voltage of said booster circuit to thereby control a level of the dead zone to a preset level corresponding to that which would be expected for a predetermined constant output voltage of the booster circuit.

3. An inverter circuit as claimed in claim 1, wherein said pulse generating section comprises a booster circuit for boosting voltage of the dc power source to generate the pulse signal for controlling said inverter.

4. An inverter circuit as claimed in claim 1, wherein said command signal compensation section includes a memory that stores level data for the dead zone.

5. An inverter circuit as claimed in claim 1, wherein said output terminals are connected to an electric motor.

6. An inverter circuit as claimed in claim 5, wherein: said inverter includes three pairs of a high-side switching element and a low-side switching element; and said electric motor is a three-phase ac motor.

7. An inverter circuit as claimed in claim 1, wherein said dc power source is a battery mounted in a vehicle.

8. An inverter circuit as claimed in claim 6, wherein said electric motor is included in a power steering system for assisting a driver to steer wheels by a steering wheel of a vehicle.

9. An inverter circuit comprising:
    a three-phase inverter, including a three-phase bridge circuit of switching elements, said bridge circuit having a pair of input terminals connected with positive and negative terminals of a battery and three-phase output terminals for providing an electric motor with ac output power;
    a command signal processing section for providing a command signal to control the electric motor;
    a pulse generating section for generating pulse signals for controlling said inverter according to the command signal to turn on or off with timing that includes a dead time to prevent said inverter from short circuiting the battery, whereby said inverter has a dead zone of operation; and
    a command signal compensation section for modifying the command signal according to a voltage level of the battery to control a level of the dead zone to a preset level.

10. An inverter circuit as claimed in claim 9, wherein said command signal processing section provides the command signal according to signals of a steering angle sensor and a vehicle speed sensor.

11. An inverter circuit as claimed in claim 9, wherein said command signal compensation section includes a memory that stores level data for the dead zone relative to the voltage level of the battery.

12. A method for controlling a dc to ac inverter having a bridge arrangement of controlled switching elements controlled by a command signal controlling said inverter to turn on or off with timing that includes a dead time to prevent short circuiting the dc power source, whereby said inverter has a dead zone of operation, said method comprising:
    modifying the command signal as a function of changes in the dc power source voltage level to thereby control the dead zone to a preset level corresponding to that which would be expected for a predetermined constant dc power source voltage.

13. A method as in claim 12, further comprising:
    using a booster circuit for boosting the dc power source voltage; and
    wherein said modifying step changes the command signal as a function of changes in output voltage of the booster circuit.

14. A method as in claim 12, comprising storing level data for the dead zone as a function of dc power source voltage.

15. A method as in claim 12, comprising using said inverter to drive an electric motor included in a power steering system for assisting a driver in steering the wheels of a vehicle.

* * * * *